(12) United States Patent
Jalkanen et al.

(10) Patent No.: US 12,553,906 B2
(45) Date of Patent: Feb. 17, 2026

(54) METHOD FOR DETERMINING POTENCY OF THERAPEUTIC ANTI-CLEVER-1 ANTIBODY

(71) Applicant: Faron Pharmaceuticals Oy, Turku (FI)

(72) Inventors: Juho Jalkanen, Mietoinen (FI); Jami Mandelin, Helsinki (FI); Matti Karvonen, Turku (FI)

(73) Assignee: Faron Pharmaceuticals Oy, Turku (FI)

( * ) Notice: Subject to any disclaimer, the term of this patent is extended or adjusted under 35 U.S.C. 154(b) by 1003 days.

(21) Appl. No.: 17/762,489

(22) PCT Filed: Sep. 23, 2020

(86) PCT No.: PCT/FI2020/050620
§ 371 (c)(1),
(2) Date: Mar. 22, 2022

(87) PCT Pub. No.: WO2021/058866
PCT Pub. Date: Apr. 1, 2021

(65) Prior Publication Data
US 2022/0357348 A1    Nov. 10, 2022

(30) Foreign Application Priority Data

Sep. 24, 2019 (FI) ..................................... 20195805

(51) Int. Cl.
*G01N 33/92* (2006.01)

(52) U.S. Cl.
CPC ......... *G01N 33/92* (2013.01); *G01N 2500/10* (2013.01)

(58) Field of Classification Search
None
See application file for complete search history.

(56) References Cited

U.S. PATENT DOCUMENTS

| | | | |
|---|---|---|---|
| 5,922,554 A | 7/1999 | Fielding et al. | |
| 6,887,712 B1 | 5/2005 | Medford et al. | |
| 2005/0069888 A1* | 3/2005 | Jalkanen | C07K 16/28 435/325 |
| 2007/0003552 A1 | 1/2007 | Gebbink et al. | |
| 2012/0027770 A1* | 2/2012 | Jalkanen | C12Q 1/6883 435/6.12 |

FOREIGN PATENT DOCUMENTS

| | | |
|---|---|---|
| WO | 03057130 A2 | 7/2003 |
| WO | 2014011813 A1 | 1/2014 |
| WO | 2017182705 A1 | 10/2017 |

OTHER PUBLICATIONS

Politz (Biochem. J 2002 362:155) (Year: 2002).*
Li (Microcirculation 2009 16:640, p. 642 right column) (Year: 2009).*
Lund (International J Cardiology 2018 250:253) (Year: 2018).*
Karikoski (Clin Cancer Res 2014 20:6452) (Year: 2014).*
Zhen (Invest New Drugs 2017 35:566) (Year: 2017).*
Palani et al. (2011) "Stabilin-1-CLEVER-1, a type 2 macrophage marker, is an adhesion and scavenging molecule on human placental macrophages.", European Journal of Immunology 41(7):2052-63.
Office Action issued Aug. 27, 2024 in JP 2022-518880, 6 pages.
Adachi et al., "FEEL-1, a Novel Scavenger Receptor with in Vitro Bacteria-binding and Angiogenesis-modulating Activities", The Journal of Biological Chemistry, vol. 277, No. 37, Issue of Sep. 13, 2002, pp. 34264-34270.
Rantakari et al., "Stabilin-1 expression defines a subset of macrophages that mediate tissue homeostasis and prevent fibrosis in chronic liver injury", PNAS, Aug. 16, 2016, vol. 113, No. 33, pp. 9298-9303.
Ravn et al., "Structural and Pharmacological Characterization of Novel Potent and Selective Monoclonal Antibody Antagonists of Glucose-dependent Insulinotropic Polypeptide Receptor", The Journal of Biological Chemistry, vol. 288, No. 27, Jul. 5, 2013, pp. 19760-19772.
Kzhyshkowska et al., "Phosphatidylinositide 3-kinase activity is required for stabilin-1-mediated endosomal transport of acLDL", Immunobiology, 210 (2005) pp. 161-173.
Göran K. Hansson, MD, Ph.D., "Inflammation, Atherosclerosis, and Coronary Artery Disease". N Engl J Med 2005;352:1685-95.
Karikoski et al., "Clever-1/Stabilin-1 Controls Cancer Growth and Metastasis", Clin Cancer Res; 20(24) Dec. 15, 2014, pp. 6452-6464.
Kzhyshkowska et al., " Stabilin-1, a homeostatic scavenger receptor with multiple functions", J. Cell. Mol. Med. vol. 10, No. 3, 2006 pp. 635-649.
Kzhyshkowska et al., "Novel Function of Alternatively Activated Macrophages: Stabilin-1-Mediated Clearance of SPARC", The Journal of Immunology, 2006; 176:5825-5832.
Palani et al., "Monocyte Stabilin-1 Suppresses the Activation of Th1 Lymphocytes", J Immunol 2016; 196:115-123.
International Search Report and Written Opinion issued in PCT/FI2020/050620 dated Nov. 17, 2020 13 pages.

* cited by examiner

*Primary Examiner* — Changhwa J Cheu
(74) *Attorney, Agent, or Firm* — Rothwell, Figg, Ernst & Manbeck, P.C.

(57) ABSTRACT

A method for determining a potency of a therapeutic anti-Clever-1 antibody or fragment(s) thereof capable of binding to human Clever-1 by inhibition of a modified low-density lipoprotein uptake, wherein the inhibition of modified low-density lipoprotein uptake is an indication of biological activity of said anti-Clever-1 antibody or fragment(s) thereof.

12 Claims, 4 Drawing Sheets

Specification includes a Sequence Listing.

METHOD FOR DETERMINING POTENCY OF THERAPEUTIC ANTI-CLEVER-1 ANTIBODY

CROSS REFERENCE TO RELATED APPLICATION

This application is a 35 U.S.C. 371 National Phase Entry Application from PCT/FI2020/050620, filed Sep. 23, 2020, which claims the benefit of Finland Patent application Ser. No. 20/195,805 filed on Sep. 24, 2019, the disclosures of which are incorporated herein in their entirety by reference.

The instant application contains a Sequence Listing which has been submitted via EFS-Web and is hereby incorporated by reference in its entirety. Said Sequence Listing, created on Sep. 5, 2025, is named 3100-127 ST25.txt and is 17629 bytes in size.

FIELD OF THE INVENTION

The present invention relates a method and an assay for determining a potency of a therapeutic anti-Clever antibody.

BACKGROUND OF THE INVENTION

Clever-1 protein has been disclosed in the patent publication WO 03/057130, Common Lymphatic Endothelial and Vascular Endothelial Receptor-1. In recent years, increasing attention has been paid to the contribution of scavenger receptors in regulating macrophage responses to different stimuli. Clever-1 (also known as Stabilin-1) is a multifunctional molecule conferring scavenging ability on a subset of anti-inflammatory macrophages [1, 2]. In these cells, it is involved in receptor-mediated endocytosis and recycling, intracellular sorting, and transcytosis of altered and normal self-components. It has also been observed that Clever-1 is linked to the endocytosis of acLDL [1]. Also, it has been demonstrated that the expression of Clever-1 on human monocytes suppresses the activation of Th1 lymphocytes [3] indicating a possible role of Clever-1 in regulating monocyte/macrophage responses to inflammatory stimulus, i.e. inhibiting Clever-1 with an antibody may turn immunosuppressive M2 macrophages into M1 pro-inflammatory macrophages that start producing TNF-alpha and interferon gamma, and activate T cells to fight for example cancer [4].

A humanized anti-Clever-1 antibody is being developed for the treatment of cancer and it is disclosed in the patent publication WO2017/182705. When producing a pharmaceutical composition, it is not enough to formulate the drug substance into the drug product, but there is also need a potency assay to characterize the product. A potency testing is an integral in determining a drug's specific ability or capability to produce a given result. Cell-based potency assays can be used to measure drug efficacy, allow to see how a particular dose of a drug will react in a given biological system. A suitable potency assay should have close relationship with the mechanism of action and putative physiological/pharmacological activity of the drug product. There is a need for efficient and sensitive potency assays showing a close relationship to the mechanism of action and putative physiological/pharma-cological activity of the antibody drug product for use in the production of pharmaceutical compositions particularly comprising antibodies in which mechanism of action is dependent on binding to receptors on the surface of certain cells.

SUMMARY OF THE INVENTION

Now, it has been surprisingly found out that the specific antibodies capable of binding to Clever-1 have also ability to inhibit and/or block modified low-density lipoprotein, particularly acetylated low-density lipoprotein (acLDL), uptake by Clever-1. It has also been surprisingly found that not all anti-Clever-1 antibodies are capable to inhibit and/or block modified low-density lipoprotein, particularly acetylated low-density lipoprotein (acLDL) uptake by Clever-1 positive macrophages, but it has been found that anti-Clever-1 antibodies which specifically bind to certain epitope sequences or at least partly to the certain defined epitope sequences of Clever-1 inhibits and/or blocks modified LDLs, particularly acLDL, uptake efficiently.

The findings of the present invention enable evaluating the biological activity of a therapeutic anti-Clever-1 antibody by determining inhibition and/or blocking uptake of modified low-density lipoprotein, particularly acetylated low-density lipoprotein (acLDL) on Clever-1 presenting cells, and hence the present invention provides a method and an assay for determining a potency of a therapeutic anti-Clever-1 antibody or fragment(s) thereof capable of binding to human Clever-1 and inhibiting its' function. In a method according to the present invention potency of a therapeutic anti-Clever-1 antibody is determined based on the inhibition of the uptake of modified low-density lipoprotein, preferably acetylated low-density lipoprotein (acLDL), with an anti-Clever-1 antibody by binding to Clever-1. Especially, a potency assay has been developed to evaluate how well specific antibodies or their fragment(s) bind to Clever-1 and how potent they are in blocking acLDL uptake by Clever-1 positive monocytes. Thereby the method allows comparison different anti-Clever-1 antibodies and evaluation their ability to elicit a particular response at a certain dose, concentration or after storage. It has been observed that anti-Clever-1 antibody modulates the uptake of modified LDL, such as acLDL, by macrophages or cells from myeloid lineage that can be differentiated to macrophages e.g. KG-1 cells, and hence the evaluation of the biological activity is based on measuring the uptake of modified LDL after binding of anti-Clever-1 antibody to said cells expressing Clever-1. It has been observed that a cell-based method or assay according to the present invention has ability to differentiate between anti-Clever-1 antibody variants. A method or assay according to the present invention can be used for potency testing of anti-Clever-1 antibodies during product characterization and stability testing. An increased amount of unbound modified LDL, such as acLDL, is an indication of the binding of anti-Clever-1 antibody and its biological activity with Clever-1.

Typical method for determining a potency of a therapeutic anti-Clever-1 antibody or fragment(s) thereof capable of binding to human Clever-1, comprises contacting Clever-1 expressing primary cells or cell line with modified low-density lipoprotein and a therapeutic anti-Clever-1 antibody or fragment(s) thereof, and determining an inhibition of the uptake of modified LDL, wherein the inhibition of modified low-density lipoprotein uptake is an indication of biological activity of said anti-Clever-1 antibody or fragment(s) thereof.

Further, it is supposed that an anti-Clever-1 antibody binding to the Clever-1 receptor reduces the number of receptors available on the cell surface for modified low-density lipoproteins, such as acLDL, binding and hence preventing macrophage LDL cholesterol uptake and foam cells formation, i.e. the precursor of an atherosclerotic plaque. This has been observed as an increase in free LDL in cell cultures, and an increase in LDL levels of cancer patients treated with an anti-Clever-1 antibody FP-1305. Hence, the findings of the present invention may provide a novel treatment for atherosclerotic cardiovascular disease and thus reduce or even eliminate the development of atherosclerotic plaques caused by macrophages digesting modified LDLs in situation where there is excess LDL. These situations are most commonly referred to as hypercholesterolemia or dyslipidemia.

The embodiments and advantages mentioned in this text relate, where applicable, both to the method or the assay as well as to the uses according to the invention, even though it is not always specifically mentioned.

DETAILED DESCRIPTION OF THE INVENTION

Clever-1 (also known as Stabilin-1) is a multifunctional molecule conferring scavenging ability on a subset of anti-inflammatory macrophages. Clever-1 protein disclosed in the patent publication WO 03/057130, Common Lymphatic Endothelial and Vascular Endothelial Receptor-1.

In the present description, the term "an anti-Clever-1 antibody or fragment(s) thereof capable of binding to Clever-1" refers to therapeutic antibodies and fragment(s) thereof, which are capable of binding to Clever-1 and inhibiting its' function. The term "an antibody or fragment(s) thereof" is used in the broadest sense to cover an antibody or fragment(s) thereof which are capable to bind Clever-1 molecule in an individual. Especially, it shall be understood to include chimeric, humanized or primatized antibodies, as well as antibody fragments and single chain antibodies (e.g. Fab, Fv), so long they exhibit the desired biological activities.

According to an embodiment of the present invention, it has been found that anti-Clever-1 antibodies capable of binding to the specific epitope sequences or at least partly to the specific epitope sequences of Clever-1 have observed to have more activity to compete with ligand binding and/or uptake than others. The present invention provides a potency assay, which can be used to evaluate therapeutic anti-Clever-1 antibodies or their fragment(s) capability of binding to Clever-1 and inhibiting modified low-density lipoproteins uptake. According to an embodiment of the present invention, an anti-Clever-1 antibody or fragment(s) thereof comprises an antibody or fragment(s) thereof which is capable of binding at least partly to an epitope of human Clever-1, which epitope comprises the following sequences:

```
                           (SEQ ID NO: 1)
            PFTVLVPSVSSFSSR,
            and (SEQ ID NO: 2)
            QEITVTFNQFTK.
```

According to an embodiment of the present invention, the epitope of human Clever-1 further comprises one or more of sequences to which said antibody or fragment(s) thereof binds at least partly:

```
                           (SEQ ID NO: 3)
            ATQTGRVFLQ, (SEQ ID NO: 4)
            DSLRDGRLIYLF, (SEQ ID NO: 5)
            SKGRILTMANQVL,
            and (SEQ ID NO: 6)
            LCVYQKPGQAFCTCR.
```

According to a preferred embodiment of the present invention, an anti-Clever-1 antibody of fragment(s) thereof binds to an epitope of Clever-1, which epitope comprises the following sequences:

```
                           (SEQ ID NO: 1)
            PFTVLVPSVSSFSSR,
            and (SEQ ID NO: 2)
            QEITVTFNQFTK.
```

In a preferred embodiment according to the present invention, the epitope further comprises one or more of sequences selected from the group consisting of:

```
                           (SEQ ID NO: 3)
            ATQTGRVFLQ, (SEQ ID NO: 4)
            DSLRDGRLIYLF, (SEQ ID NO: 5)
            SKGRILTMANQVL,
            and (SEQ ID NO: 6)
            LCVYQKPGQAFCTCR.
```

A part of the target protein human CLEVER-1, i.e. human Stabilin-1, has defined in SEQ ID NO: 7. The epitopes SEQ ID NO: 1, SEQ ID NO: 2, SEQ ID NO: 3, SEQ ID NO: 4, SEQ ID NO: 5 and SEQ ID NO: 6 on the CLEVER-1 corresponds amino acids 420-434, 473-484, 390-399, 576-587, 615-627 and 313-327 of target protein human CLEVER-1 defined in SEQ ID NO: 7.

According to the present invention an anti-Clever-1 antibody of fragment(s) thereof may be bound to the defined epitope sequences complete or at least partly. An anti-Clever-1 antibody of fragment(s) can be bound to one, two or more of the epitope sequences completely, but on other epitope sequences only at least partly, or it can be bound all epitope sequences only partly. According to an embodiment of the invention, it is assumed that the epitope sequences to which an anti-Clever-1 antibody or fragment(s) thereof binds are at least 50%, 60%, 70%, 80%, 85%, 90%, 95% or even 98%, 99% or 100% identical to the defined epitope sequences, wherein the binding has been observed by an inhibition of the uptake of modified LDL. According to an embodiment of the present invention, it is assumed that the epitope sequences to which an anti-Clever-1 antibody or fragment(s) thereof binds are 50-100% identical with the defined sequences SEQ ID NO:1-SEQ ID NO: 6.

According to an embodiment of the present invention, an anti-Clever-1 antibody or antibody fragment that is capable of binding to Clever-1 is capable of binding to the specific Clever-1 epitope and directly or indirectly exerting a biologic effect. According to an embodiment of the present invention, anti-Clever-1 antibody or antigen binding fragments thereof comprises the following sequences of complementarity determining regions (CDRs) of the heavy chain:

```
CDR1:
                                 (SEQ ID NO: 10)
TSGMGIG,

CDR2:
                                 (SEQ ID NO: 11)
HIWWDDDKRYNPALKS,
and

CDR3:
                                 (SEQ ID NO: 12)
HYGYDPYYAMDY,
and
``` the following sequences of complementarity determining regions (CDRs) of the light chain:

```
CDR1:
                                 (SEQ ID NO: 13)
TASSSVSSSYLH,

CDR2:
                                 (SEQ ID NO: 14)
RTSNLAS,
and

CDR3:
                                 (SEQ ID NO: 15)
HQYHRSPPT.
```

According to an embodiment of the present invention, the anti-Clever-1 antibody or antigen binding fragment thereof comprises a heavy chain variable region comprising SEQ ID NO: 8, and a light chain variable region comprising SEQ ID NO: 9.

According to an embodiment of the invention, an anti-Clever-1 antibody is a therapeutic humanized anti-Clever-1 antibody. In an embodiment according to the present invention, an anti-Clever-1 antibody may be a humanized antibody constructed from the monoclonal antibody 3-372 disclosed in the patent publication WO 03/057130. According to an embodiment of the present invention an anti-Clever-1 antibody is a humanized monoclonal Clever-1 antibody, previously presented in the patent publication WO2017/182705. In an embodiment according to the present invention, an anti-Clever-1 antibody comprises the constant regions of human IgG4 heavy chain and kappa light chain, and a heavy chain variable region comprising SEQ ID NO: 8 and a light chain variable region comprising SEQ ID NO: 9.

In an embodiment of the present invention, the anti-Clever-1 antibody is a humanized monoclonal immunoglobulin G4K antibody bexmarilimab (International Nonproprietary Name (INN)) as disclosed in WHO Drug Information, Vol. 33, No. 4, pages 814-815 (2019)), or bexmarilimab variant or the antibody in a bexmarilimab biosimilar. Anti-Clever-1 antibody bexmarilimab is an exemplary antibody which potency can be determined in the method according to the present invention. As used herein, "bexmarilimab" means the IgG4 monoclonal antibody with the structure described in WHO Drug Information, Vol. 33, No. 4, pages 814-815 (2019). Anti-Clever-1 antibody bexmarilimab comprises heavy chain variable region comprising SEQ ID NO: 8 and a light chain variable region comprising SEQ ID NO: 9. Anti-Clever-1 antibody bexmarilimab comprises the light and heavy chain CDRs mentioned above (SEQ ID NO:10-SEQ ID NO:15).

A bexmarilimab biosimilar means a biological product which is approved by a regulatory agency in any country for marketing as a bexmarilimab biosimilar. In an embodiment, a bexmarilimab biosimilar comprises a bexmarilimab variant as the drug substance. In an embodiment, a bexmarilimab biosimilar has substantially the same amino acid sequence of heavy and light chains as bexmarilimab. As used herein, a "bexmarilimab variant" means an antibody which comprises sequences of heavy chain and light chain that are identical to those in bexmarilimab, except for having one or more conservative amino acid substitutions at positions that are located outside of the light chain CDRs and/or one or more conservative amino acid substitutions that are located outside of the heavy chain CDRs, e.g. the variant positions are located in the framework regions or the constant region. In other words, bexmarilimab and a bexmarilimab variant comprise identical CDR sequences, but differ from each other due to having a conservative amino acid substitution at other positions in their full-length light and heavy chain sequences. A bexmarilimab variant is substantially the same as bexmarilimab with respect to binding affinity to CLEVER-1.

According to an embodiment of the present invention, a cell line producing the therapeutic anti-Clever-1 antibody bexmarilimab (FP-1305) has been deposited on 27 May 2020 under the terms of the Budapest Treaty on the International Recognition of the Deposit of Micro-organisms for the Purposes of Patent Procedure with the DSMZ-German Collection of Microorganisms and Cell Cultures GmbH, Inhoffenstrasse 7B, D-38124 Braunschweig, Germany, and has the accession number DSM ACC3361. The present invention is not to be limited in scope by the culture deposited, since the deposited embodiment is intended as a single illustration of one aspect of the invention and any culture that is functionally equivalent is within the scope of this invention. The deposit of material herein does not constitute an admission that the written description herein contained is inadequate to enable the practice of any aspect of the invention, including the best mode thereof, nor is it to be construed as limiting the scope of the claims to the specific illustration that it represents.

The present invention relates to a cell-based biological activity assay for an anti-Clever-1 antibody targeting Clever-1, especially targeting to the specific epitopes of Clever-1 or at least part of the specified Clever-1 epitopes defined in the present disclosure. The present invention provides a relative potency bioassay, in which the Clever-1 expressing primary cells or cell line(s) are co-incubated with modified low-density proteins and anti-Clever-1 antibody for determining biological activity of the anti-Clever-1 antibodies. In a preferred embodiment according to the present invention, Clever-1 expressing KG-1 cell line, which is a common commercially available cell line, is used in the potency assay according to the present invention. The ability of anti-Clever-1 antibody to compete with ligand binding and/or inhibit modified low-density lipoprotein uptake is measured and used as an indicator of its biological activity. A selection of anti-Clever-1 antibodies having desired biological activity were assessed using the method according to the present invention, i.e. a method according to the invention is ability to differentiate between anti-Clever-1 antibody variants. The amount of the uptake of modified LDL, such as acLDL, indicates the binding affinity of anti-Clever-1 antibody to Clever-1. More efficiently the uptake of modified LDLs, such as acLDL is inhibited, more efficient is the binding of the anti-Clever-1 antibody.

In a method according to the present invention a potency of a therapeutic anti-Clever-1 antibody or fragment(s) thereof capable of binding to human Clever-1 is determined by inhibition of modified LDL uptake by said anti-Clever-1 antibody, preferably by inhibition of acLDL uptake by said anti-Clever-1 antibody. The method according to the present invention comprises contacting Clever-1 expressing primary cells or cell line with said anti-Clever-1 antibody and modified LDL and determining a relative inhibition of modified LDL uptake. According to a preferred embodiment of the method of the present invention, the modified low-density lipoprotein comprises acetylated low-density lipoprotein (acLDL), wherein an inhibition of the uptake of acetylated low-density lipoprotein is determined. The uptake of acLDL has observed to be efficiently inhibited by anti-Clever-1 antibodies defined previously in the present disclosure and binding at least partly to specific epitope of human Clever-1, which epitope comprises the following sequences:

PFTVLVPSVSSFSSR, (SEQ ID NO: 1)
and

QEITVTFNQFTK. (SEQ ID NO: 2)

Further, according to an embodiment of the present invention the epitope of Clever-1 further comprises one or more of sequences to which said antibody or fragment(s) thereof binds at least partly:

ATQTGRVFLQ, (SEQ ID NO: 3)

DSLRDGRLIYLF, (SEQ ID NO: 4)

SKGRILTMANQVL, (SEQ ID NO: 5)
and

LCVYQKPGQAFCTCR. (SEQ ID NO: 6)

According to an embodiment of the present invention the uptake of modified LDL is measured by using flow cytometry or a microplate reader-based method known in the art.

According to the present invention any modified low-density lipoprotein can be utilized in the method or assay for determining potency of anti-Clever-1 antibody by inhibition of uptake of modified low-density lipoprotein and thereby confirming the ability of said antibody to elicit a particular response at a certain dose. According to a preferred embodiment of the present invention, the modified low-density lipoprotein comprises acetylated low-density lipoprotein (acLDL), which is used in the method or the assay. According to the present invention acLDL can be any suitable acLDL or acLDL complex. An anti-Clever-1 antibody targeting to the specific epitopes of Clever-1 or at least part of the specified Clever-1 epitopes defined in the present disclosure has been observed efficiently to inhibit acLDL uptake. Inhibition of acLDL uptake may also be dependent on the dosage of the anti-Clever-1 antibody.

According to an embodiment of the present invention the modified low-density lipoprotein utilized in the method or assay comprises fluorescently labeled modified LDL, preferably fluorescently labeled acLDL, wherein the competitive binding can be measured e.g. by mean fluorescence intensity (MFI).

According to an embodiment of the present invention the Clever-1 expressing primary cells or cell line are contacted with said anti-clever-1 antibody or fragment(s) thereof and modified low-density lipoprotein by incubating them at 32-40° C., preferably about 37° C. The temperature range of 32-40° C., preferably about 37° C., has observed to provide an internalization of modified low-density lipoprotein.

In a relative potency bioassay according to a preferred embodiment of the present invention, the Clever-1 expressing KG-1 cell line is co-incubated with fluorescently labelled acLDL and a titration of anti-Clever-1 antibody. The ability of anti-Clever-1 antibody to compete with ligand binding and uptake at 32-40° C., preferably about 37° C., measured by flow cytometry, is used as an indicator of its biological activity.

According to an embodiment of the present invention the Clever-1 expressing cells or cell line are incubated with said anti-Clever-1 antibody or fragment(s) thereof and modified low-density lipoprotein in medium comprising serum for improving detecting of the modified LDL uptake, i.e. increase in fluorescence. However, according to the present invention the cells can be cultured in any suitable medium known in the art.

In a method according to an embodiment of the present invention, the inhibition of 25-100% of the intake of modified low-density lipoprotein is considered to be an indication of biological activity of said anti-Clever-1 antibody or fragments thereof. More efficiently the uptake of modified LDLs, such as acLDL is inhibited, more efficient is the binding of the anti-Clever-1 antibody.

It has also been observed that anti-Clever-1 antibodies or fragment(s) thereof specified above that are capable of binding to at least partly of defined epitope sequences has an ability to efficiently inhibit modified LDLs uptake, particularly acLDL uptake and therefore preventing Clever-1 positive macrophages from digesting low-density lipoproteins and becoming foam cells that leads to atherosclerotic plaque formation. Modified low-density lipoproteins comprises oxidized LDL (oxLDL), acetylated LDL (acLDL), ethylated, methylated, and glycated LDL (gLDL), and they have been commonly accepted to initiate atherosclerotic processes. It has been found that the uptake of the modified LDLs can be inhibited by an anti-Clever-1-antibody or fragment(s) thereof capable of binding at least partly to the above specified epitope sequences. In a preferred embodiment according to the present invention, it has been observed that the uptake of the acetylated LDL (acLDL) can be efficiently inhibited by an anti-Clever-1-antibody capable of binding at least partly to the above specified epitope sequences. Hence, said anti-Clever-1 antibodies or fragment(s) thereof capable of binding to above defined epitopes sequences or binding at least partly to the specified epitope sequences can also be used in the treatment of hypercholesterolemia, dyslipidemia and/or atherosclerotic cardiovascular disease. It is assumed that the inhibition of LDL uptake is more efficient, when the binding affinity of anti-Clever-1 antibody to said epitope sequences is increased. Hence, a method for treating hypercholesterolemia, dyslipidemia and/ or atherosclerotic cardiovascular disease may comprise administering to an individual an anti-Clever-1 antibody or fragment(s) thereof of therapeutically effective amounts to bind to Clever-1.

The term "treatment" or "treating" shall be understood to include complete curing of a disease or disorder, as well as amelioration or alleviation of said disease or disorder. The term "therapeutically effective amount" is meant to include any amount of an agent according to the present invention that is sufficient to bring about a desired therapeutic result.

The present invention for treating atherosclerotic cardiovascular disease by reducing and/or inhibiting foam cell and atherosclerotic plaque formation by inhibiting macrophages from taking up modified LDL in any condition where un-necessary LDL uptake is un-wanted, for example but not limiting to clinical conditions with excess LDL referred to as hypercholesterolemia or dyslipidemia.

"Administering" refers to the physical introduction of a composition comprising said therapeutic antibodies or fragment(s) thereof to an individual, using any of the various methods and delivery systems known to those skilled in the art. The antibodies or fragment(s) thereof to be used in the present invention may be administered by any means that achieve their intended purpose. For example, administration may be intravenous, intramuscular, intraperitoneal, intratumoral, subcutaneous or other parenteral routes of administration, for example by injection. In addition to the pharmacologically active compounds, the pharmaceutical preparations of said antibodies or fragment(s) thereof preferably contain suitable pharmaceutically acceptable carriers comprising excipients and auxiliaries that facilitate processing of the active antibodies or fragment(s) thereof into preparations that can be used pharmaceutically. The dose chosen should be sufficient to reduce uptake of LDLs and the development of atherosclerotic plaques.

A pharmaceutical composition or drug product according to the invention comprises the antibodies or fragment(s) thereof. The pharmaceutical composition may further comprise an appropriate excipient or excipients. A pharmaceutical composition can be used in the treatment of hypercholesterolemia, dyslipidemia and/or atherosclerotic cardiovascular disease.

Experimental

EXAMPLE 1

Potency Assay to Assess an Ability of the Agents to Bind to Clever-1 and Block acLDL Binding Anti-Clever-1 antibodies used in the present Example:
humanized anti-Clever-1 antibody FP-1305,
isotype control HuIgG4 S241P L248E for FP-1305,
anti-Clever-1 antibody ACP33STcp43-cp12, corresponding with antibody FP-1305 but produces at a different facility,
MoIgG clone 3-372, a parental clone of humanized anti-Clever-1 antibody FP-1305,
monoclonal antibody (mAb) 9-11.

An anti-Clever-1 antibody FP-1305 (DSM ACC3361) is a humanized antibody currently being developed by Faron Pharmaceuticals for cancer treatment and it is disclosed more detailed in the patent publication WO2017/182705 and known as bexmarilimab.

It has been previously presented in the patent publication WO2017/182705 that the anti-Clever-1 antibodies 3-372 and 9-11 bind to different epitope sequences in human Clever-1. More detailed, the defined epitope sequences from SEQ ID NO:7 for the anti-Clever-1 antibodies 9-11, 3-372 and the humanized anti-Clever-1 antibody FP-1305 are presented in the following Table 1. The anti-Clever-1 antibodies FP-1305 and 3-372 were shown to recognize the same epitope in the FAS1/FAS2 domains. The screening and the identification of the following epitope sequences and domain organization of Clever-1 are presented in more detail in the patent publication WO2017/182705. In the present disclosure, the focus is the functional difference between the antibodies, which have been observed to bind the different epitope sequences of Clever-1 (SEQ ID NO:7).

TABLE 1

| Antibody | Epitope sequences in SEQ ID NO: 7 | Domain | SEQ ID NO |
|---|---|---|---|
| 9-11 | 885PSNPCSHPDRGG896 | EGF-like 6 | 16 |
|  | 166FRGSACQECQDPNRF180 | EGF-like 1 | 17 |
| FP-1305 + | 420PFTVLVPSVSSFSSR434 | FAS 1 | 1 |
| 3-372 | 473QEITVTFNQFTK484 | FAS 1 | 2 |
|  | 390ATQTGRVFLQ399 | FAS 1 | 3 |
|  | 576DSLRDGRLIYLF587 | FAS 2 | 4 |
|  | 615SKGRILTMANQVL627 | FAS 2 | 5 |

Characterization of KG-1 Cell Line

To confirm Clever-1 expression and anti-Clever-1 antibodies binding, the flow cytometry assays were performed on KG-1 cells.

KG-1 cells (ATCC, CRL-246, Manassas, VA) were recovered and maintained in IMDM (ThermoFisher Scientific, Loughborough, UK) supplemented with 20% FBS (Corning, Amsterdam, The Netherlands) and 2% P/S (ThermoFisher Scientific, Loughborough, UK).

Figure 1:
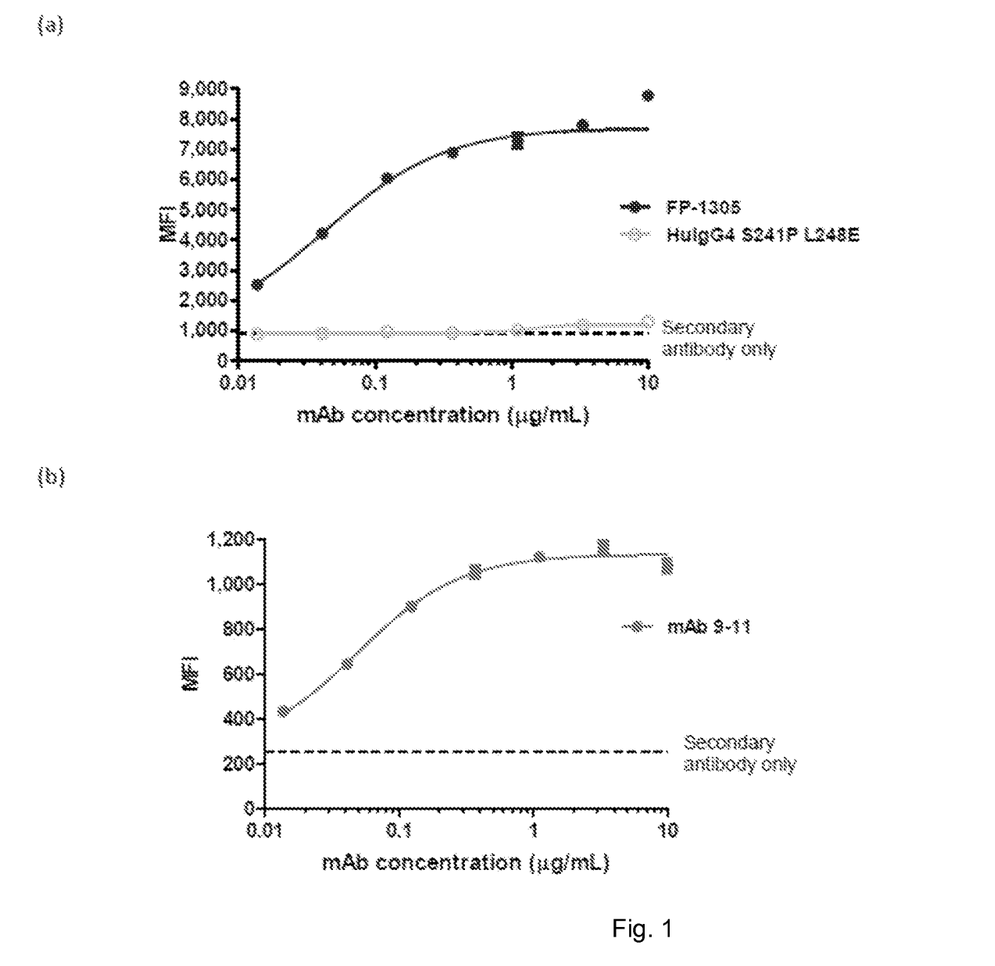
FIG. 1. Binding of (a) anti-Clever-1 antibody FP-1305 and the isotype control HuIgG4 S241P L248E for FP-1305 and (b) monoclonal antibody 9-11 to KG-1 cells. The MFI in the absence of primary antibody is represented by a dotted line.

In summary, $1 \times 10^5$ KG-1 cells per well of a 96-well plate were stained with a titration (10–0.014 µg/mL) of anti-Clever-1 antibody FP-1305, monoclonal antibody 9-11 for Clever-1 or HuIgG4 S241P L248E (the isotype control for FP-1305) for 30 minutes at 4° C. Excess primary antibody was removed and the cells were then incubated for a further 30 minutes at 4° C. with either an AlexaFluor 647 labelled anti-HuIgG or PE labelled anti-rat IgG antibody (ThermoFisher Scientific, Loughborough, UK) at 10 µg/mL. The unbound secondary antibody was washed away, and the cells fixed with BD CellFix (BD Biosciences, Oxford, UK) before analysis. Samples were acquired on an Attune NxT focussing cytometer equipped with a blue and red laser (ThermoFisher Scientific, Loughborough, UK) using the BL2 and RL1 channels for PE and AlexaFluor 647 dyes, respectively. The MFI values were plotted against the antibody concentration. FIG. 1 presents the binding of: (a) anti-Clever-1 antibody FP-1305 and the isotype control HuIgG4 S241P L248E for FP-1305 and (b) monoclonal antibody 9-11 for Clever-1 to KG-1 cells. The MFI in the absence of primary antibody is represented by a dotted line. Both anti-Clever-1 antibody FP-1305 and monoclonal antibody 9-11 showed a dose-dependent binding to KG-1 cells, whereas the isotype control HuIgG4 S241P L248E resulted in a signal comparable to the cells stained solely with the secondary antibody. These results confirmed that KG-1 is a suitable cell line to a cell-based biological activity assay for an anti-Clever-1 antibody.

Selection of the Ligand Binding Conditions

AcLDL used in the present Example is commercially available as an AlexaFluor 488 labelled protein (ThermoFisher Scientific, Loughborough, UK) and can consequently be used for direct measurement of fluorescence.

Figure 2:
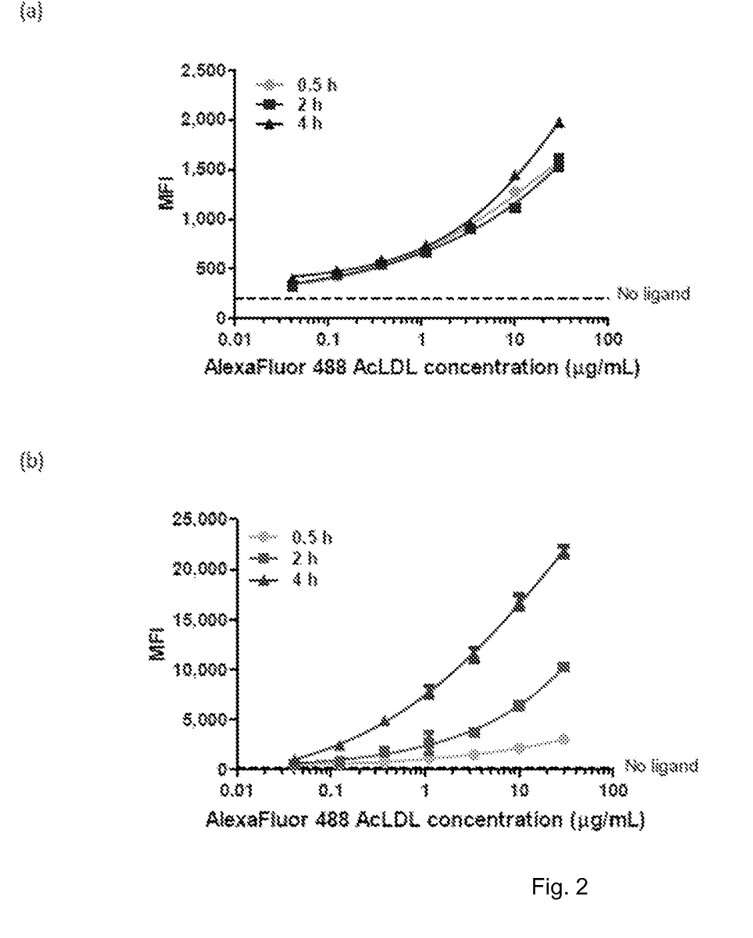
FIG. 2. Binding and/or uptake of AlexaFluor 488 AcLDL to KG-1 cells after incubation at: (a) 4° C. and (b) 37° C. The cells were incubated in the presence of the ligand for 0.5, 2 or 4 hours. The MFI in the absence of ligand is represented by a dotted line.

KG-1 cells (ATCC, CRL-246, Manassas, VA) were first serum-starved overnight. On the day of the assay the cells were seeded at $1\times10^5$ cells per well in a 96-well plate and incubated with a titration of AlexaFluor 488 AcLDL (30–0.041 µg/mL) for 0.5, 2 or 4 hours at either 4° C. or 37° C. Excess ligand was then removed, the cells fixed and analyzed on the Attune NxT flow cytometer. The results are shown in FIG. 2, the binding and/or uptake of AlexaFluor 488 AcLDL to/by KG-1 cells after incubation at: (a) 4° C. and (b) 37° C. The results show a dose-dependent increase in binding and/or uptake at both temperatures. The cells were incubated in the presence of the ligand for 0.5, 2 or 4 hours. The MFI in the absence of ligand is represented by a dotted line. The binding observed at 4° C. (FIG. 2(a)) was conserved across the different incubation times, a result consistent with the expected absence of internalization at this temperature. When the incubation was performed at 37° C. (FIG. 2(b)), MFI values increased with time, suggesting accumulation of the fluorescently labelled ligand either inside or on the surface of the KG-1 cells.

Confirming the Ability of Anti-Clever-1 Antibody to Compete with AcLDL

The ability of anti-Clever-1 antibody FP-1305 to compete with AcLDL binding to and uptake by KG-1 cells (ATCC, CRL-246, Manassas, VA) was assessed.

Figure 3:
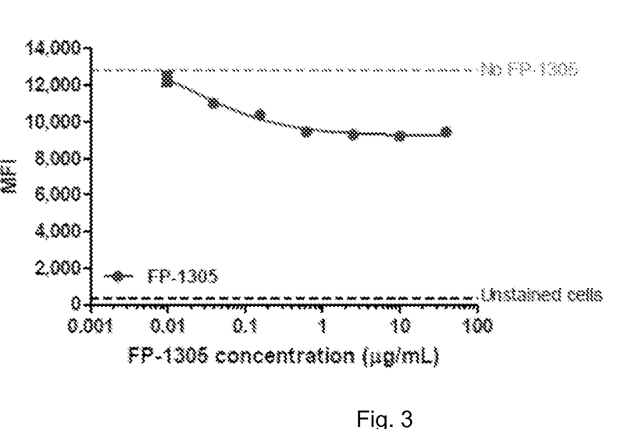
FIG. 3. Assessment of an anti-Clever-1 antibody FP-1305 ability to inhibit AcLDL uptake by KG-1 cells. MFI in the presence of AlexaFluor 488 AcLDL but in the absence of FP-1305 and unstained cells are represented by the dotted lines.

Serum-starved KG-1 cells were incubated with a titration of anti-Clever-1 antibody FP-1305 (40–0.0098 µg/mL), followed by the addition of AlexaFluor 488 AcLDL (ThermoFisher Scientific, Loughborough, UK) at 10 µg/mL. As shown in FIG. 3, the anti-Clever-1 antibody FP-1305 can compete with ligand binding and a dose-dependent reduction in MFI was noted when the cells were incubated at 37° C. Based on these results, the inhibition of AcLDL binding and uptake was confirmed functioning as the biological activity assay for an anti-Clever-1 antibody.

Figure 4:
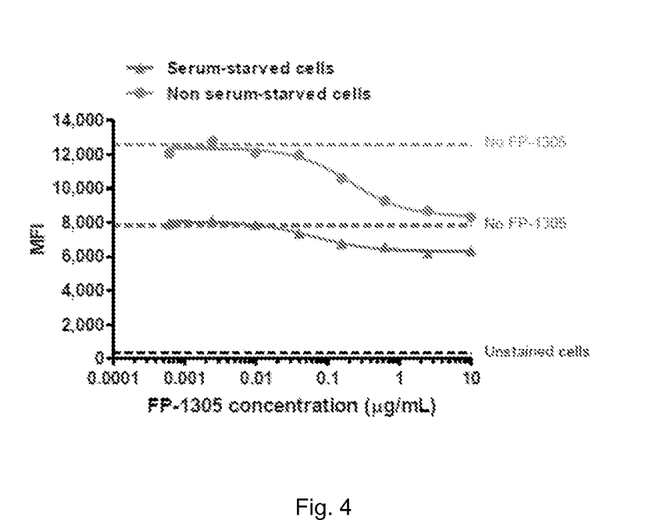
FIG. 4. Effect of serum starvation on anti-Clever-1 antibody FP-1305 for inhibiting AlexaFluor 488 AcLDL uptake by KG-1 cells. The black dotted line represents unstained cells FIG. 5. Direct comparison between increasing concentrations of anti-Clever-1 antibody FP-1305 competition with acLDL for binding to and uptake by KG-1 cells (Clever-1 positive monocytes) measured using: (a) the Attune NxT flow cytometer and (b) a SpectraMax i3x plate reader. MFI in the presence of AlexaFluor 488 AcLDL but in the absence of anti-Clever-1 antibody FP-1305 is represented by the dotted line.

In addition, the need for serum starvation was assessed by cells that had been seeded overnight in complete medium or serum free medium. An overall increase in fluorescence was observed for the cells incubated in complete serum, as shown in FIG. 4.

Assessment of a Set of Anti-CLEVER-1 Antibodies Using the Assay According to the Present Invention CLEVER-1 expressing KG-1 cells were incubated with AlexaFluor 488 labelled acLDL AcLDL in the presence of a titration of the humanized anti-Clever-1 antibody FP-1305 (FIG. 5), and in the presence of FP-1305 and other Clever-1 inhibiting agents with acLDL (FIG. 6), and binding and uptake was analysed and used as an indicator of biological activity.

The assessment of the binding was carried out by the following protocol:

1. Frozen KG-1 cells (ATCC, CRL-246, Manassas, VA) were recovered in complete medium (IMDM+2% P/S+20% FBS), seeded in 96-well plates and allowed to recover overnight at 37° C.;

2. The cells were incubated with a titration of FP-1305 or other Clever-1 inhibiting agents for 30 minutes at 37° C.;

3. AlexaFluor 488 AcLDL (ThermoFisher Scientific, Loughborough, UK) was added to a final concentration of 10 µg/mL;

4. The cells were incubated for a further two hours at 37° C.;

5. Excess ligand was washed away (PBS+0.3% BSA), the cells were fixed and analysed by flow cytometry.

Figure 5:
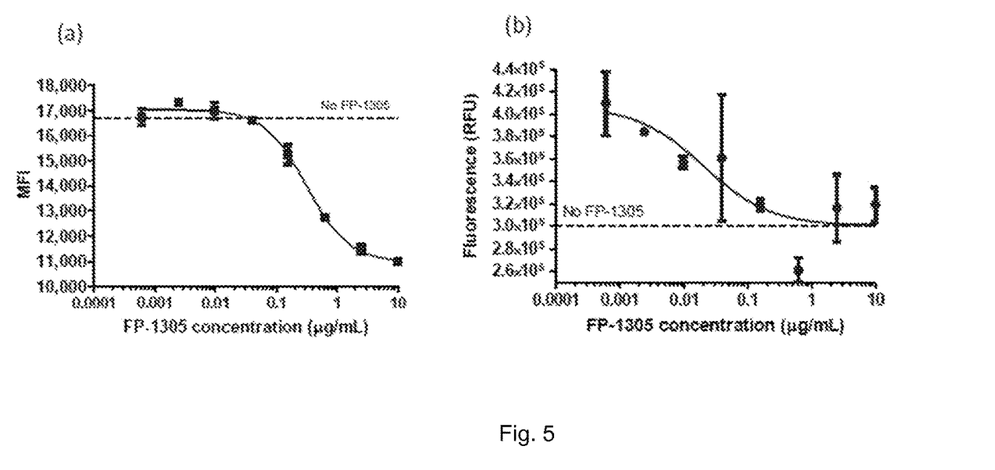
Figure 6:
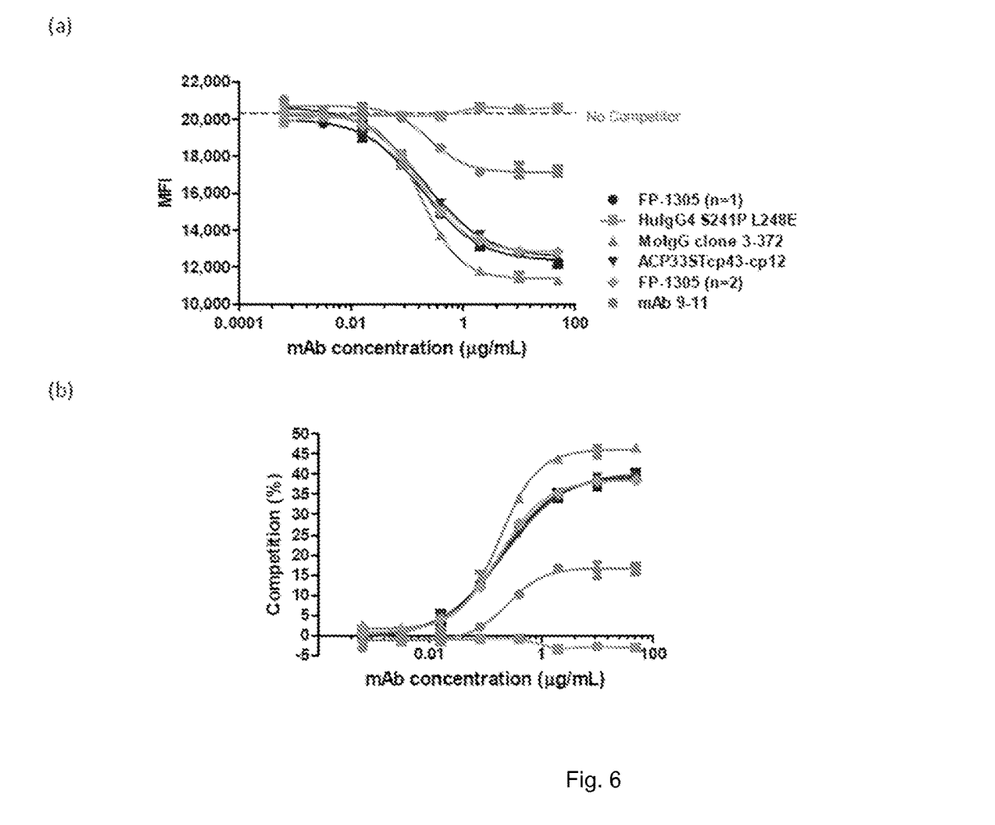
FIG. 6. The ability of Clever-1 binding agents to compete with binding and uptake of acLDL at 37° C. in Clever-1 positive monocytes (KG1 cell line), as measured by flow cytometry, is used as an indicator of biological activity: (a) raw MFI values or (b) percentage competition. MFI in the presence of AlexaFluor 488 AcLDL but in the absence of anti-Clever-1 antibody FP-1305, corresponding to 0% competition, is represented by the dotted line.

The response of the humanized anti-Clever-1 antibody FP-1305 is shown to be specific, i.e. the isotype control HuIgG4 S241P L248E had no effect. The antibodies ACP33STcp43-cp12 and MoIgG clone 3-372 are also shown to be specific and also block acLDL binding. Whereas monoclonal antibody (mAb) 9-11 appeared as a weaker competitor. Anti-Clever-1 antibodies FP-1305, ACP33STcp43-cp12 and MoIgG clone 3-372 prevent macrophage LDL cholesterol uptake and foam cells formation, since acLDL is not digested. This is seen as a decrease of intracellular LDL in cells (FIGS. 5 and 6). Not all anti-Clever-1 antibodies block the internalization of acLDL to Clever-1 positive macrophages, such as mAb 9-11. Hence, the method according to the present invention could be used to differentiate between anti-Clever-1 antibody variants i.e., used as a potency assay for determining biological activity.

Further, it can be concluded that only certain anti-Clever-1 can be used to prevent Clever-1 positive macrophages from digesting acetylated low-density lipoproteins (acLDL) and becoming foam cells that leads to atherosclerotic plaque formation.

EXAMPLE 2

Cancer Patients Treated with Clever-1 Inhibiting Anti-Clever-1 Antibody FP-1305

Clever-1 inhibiting agent, an anti-Clever-1 antibody FP-1305 (DSM ACC3361), is currently being tested for safety and preliminary efficacy in a Phase I/II study in patient with advanced solid tumors (clinicaltrials.gov NCT03733990: A Study to Evaluate Safety, Tolerability and Preliminary Efficacy of FP-1305 in Cancer Patients (MATINS)). First (pre-dose) fasting plasma sample taken prior to initiating FP-1305. Second fasting plasma sample (post-dose) taken at the end of the first 3 weeks treatment cycle of an anti-Clever-1 antibody FP-1305. The results are shown in Table 2, plasma LDL (P-LDL) levels expressed as mmol/L.

TABLE 2

| | P-LDL (mmol/L) | |
|---|---|---|
| | Pre-dose | Post dose |
| Patient 1 | 2.7 | 3.4 |
| Patient 2 | 1.9 | 2.5 |
| Patient 3 | 3.3 | 3.5 |

TABLE 2-continued

| | P-LDL (mmol/L) | |
|---|---|---|
| | Pre-dose | Post dose |
| Patient 4 | 3.8 | 4.8 |
| Patient 5 | 2.7 | 3.0 |

Patient that receive anti-Clever-1 antibody FP-1305, an increase in plasma LDL (P-LDL) levels as shown in Table 2, indicating that LDL binding and uptake is inhibited or blocked by Clever-1 monocytes/macrophages. Anti-Clever-1 antibodies FP-1305 prevents macrophage LDL cholesterol uptake and foam cells formation, since acLDL is not digested. This is seen as an increase in LDL levels of cancer patients treated with said anti-Clever-1 antibody.

CITED REFERENCES

[1] Kzhyshkowska J., Gratchev A., Goerdt S., Stabilin-1, a homeostatic scavenger receptor with multiple functions. J Cell Mol Med 2006; 10(3):635-49.
[2] Kzhyshkowska J., Workman G., Cardó-Vila M., Arap W., Pasqualini R., Gratchev A., et. al. Novel function of alternatively activated macrophages: stabilin-1-mediated clearance of SPARC. J Immunol 2006; 176(10):5825-32.
[3] Palani S., Elima K., Ekholm E., Jalkanen S., Salmi M., Monocyte Stabilin-Suppresses the Activation of Th1 Lymphocytes. J Immunol 2016; 196(1):115-23.
[4] Karikoski M., Marttila-Ichihara F., Elima K., Rantakari P., Hollmén M., Kelkka T., et. al., Clever-1/Stabilin-1 Controls Cancer Growth and Metastasis. Clinical Cancer Research 2014; 20(24):6452-64 doi 10.1158/1078-0432.CCR-14-1236.

The invention claimed is:

1. A method for determining potency of a therapeutic anti-Clever-1 antibody or fragment(s) thereof capable of binding to human Clever-1, the method comprising
contacting a Clever-1 expressing KG-1 cell line with acetylated low-density lipoprotein (acLDL) and the therapeutic anti-Clever-1 antibody or fragment(s) thereof, and
determining an inhibition of acLDL uptake in said cells, wherein the inhibition of uptake is an indication of biological activity of said anti-Clever-1 antibody or fragment(s) thereof to bind human Clever-1.

2. The method according to claim 1, wherein the uptake is measured by using flow cytometry.

3. The method according to claim 1, wherein the acLDL comprises fluorescently labeled acLDL.

4. The method according to claim 1, wherein said anti-Clever-1 antibody or fragment(s) thereof is bexmarilimab or bexmarilimab variant or the antibody in a bexmarilimab biosimilar.

5. The method according to claim 1, wherein said anti-Clever-1 antibody is bexmarilimab.

6. The method according to claim 1, wherein the KG-1 cell line is contacted with said anti-Clever-1 antibody or fragment(s) thereof and acLDL by incubating them at 32-40° C.

7. The method according to claim 1, wherein the KG-1 cell line is incubated with said anti-Clever-1 antibody or fragment(s) thereof and acLDL in medium comprising serum.

8. The method according to claim 1, wherein the inhibition of 25-100% of the intake of acLDL is an indication of biological activity of said anti-Clever-1 antibody or fragment(s) thereof to bind human Clever-1.

9. The method of claim 6, wherein the KG-1 cell line, the anti-Clever1 antibody or fragment(s) thereof, and the acLDL are incubated together at about 37° C.

10. The method according to claim 1, wherein the uptake is measured by using a microplate reader-based method.

11. The method according to claim 1, comprising detecting 25-100% inhibition the intake of acLDL.

12. The method according to claim 1, wherein the anti-Clever-1 antibody or fragment(s) thereof comprises a heavy chain variable region comprising SEQ ID NO: 8, and a light chain variable region comprising SEQ ID NO: 9.

* * * * *

SEQUENCE LISTING

```
<160> NUMBER OF SEQ ID NOS: 17

<210> SEQ ID NO 1
<211> LENGTH: 15
<212> TYPE: PRT
<213> ORGANISM: Homo sapiens

<400> SEQUENCE: 1

Pro Phe Thr Val Leu Val Pro Ser Val Ser Ser Phe Ser Ser Arg
1               5                   10                  15

<210> SEQ ID NO 2
<211> LENGTH: 12
<212> TYPE: PRT
<213> ORGANISM: Homo sapiens

<400> SEQUENCE: 2

Gln Glu Ile Thr Val Thr Phe Asn Gln Phe Thr Lys
1               5                   10

<210> SEQ ID NO 3
<211> LENGTH: 10
<212> TYPE: PRT
<213> ORGANISM: Homo sapiens

<400> SEQUENCE: 3

Ala Thr Gln Thr Gly Arg Val Phe Leu Gln
1               5                   10

<210> SEQ ID NO 4
<211> LENGTH: 12
<212> TYPE: PRT
<213> ORGANISM: Homo sapiens

<400> SEQUENCE: 4

Asp Ser Leu Arg Asp Gly Arg Leu Ile Tyr Leu Phe
1               5                   10

<210> SEQ ID NO 5
<211> LENGTH: 13
<212> TYPE: PRT
<213> ORGANISM: Homo sapiens

<400> SEQUENCE: 5

Ser Lys Gly Arg Ile Leu Thr Met Ala Asn Gln Val Leu
1               5                   10
```

```
<210> SEQ ID NO 6
<211> LENGTH: 15
<212> TYPE: PRT
<213> ORGANISM: Homo sapiens

<400> SEQUENCE: 6

Leu Cys Val Tyr Gln Lys Pro Gly Gln Ala Phe Cys Thr Cys Arg
1               5                   10                  15

<210> SEQ ID NO 7
<211> LENGTH: 1051
<212> TYPE: PRT
<213> ORGANISM: Homo sapiens

<400> SEQUENCE: 7

Leu Cys Cys Ala Cys Leu Leu Glu Leu Ile Pro Tyr Ala Pro Thr Leu
1               5                   10                  15

Ser Trp Thr Ala Cys Pro Pro Ala Met Ala Gly Pro Arg Gly Leu Leu
                20                  25                  30

Pro Leu Cys Leu Leu Ala Phe Cys Leu Ala Gly Phe Ser Phe Val Arg
            35                  40                  45

Gly Gln Val Leu Phe Lys Gly Cys Asp Val Lys Thr Thr Phe Val Thr
        50                  55                  60

His Val Pro Cys Thr Ser Cys Ala Ala Ile Lys Lys Gln Thr Cys Pro
65                  70                  75                  80

Ser Gly Trp Leu Arg Glu Leu Pro Asp Gln Ile Thr Gln Asp Cys Arg
                85                  90                  95

Tyr Glu Val Gln Leu Gly Gly Ser Met Val Ser Met Ser Gly Cys Arg
            100                 105                 110

Arg Lys Cys Arg Lys Gln Val Val Gln Lys Ala Cys Cys Pro Gly Tyr
        115                 120                 125

Trp Gly Ser Arg Cys His Glu Cys Pro Gly Gly Ala Glu Thr Pro Cys
    130                 135                 140

Asn Gly His Gly Thr Cys Leu Asp Gly Met Asp Arg Asn Gly Thr Cys
145                 150                 155                 160

Val Cys Gln Glu Asn Phe Arg Gly Ser Ala Cys Gln Glu Cys Gln Asp
                165                 170                 175

Pro Asn Arg Phe Gly Pro Asp Cys Gln Ser Val Cys Ser Cys Val His
            180                 185                 190

Gly Val Cys Asn His Gly Pro Arg Gly Asp Gly Ser Cys Leu Cys Phe
        195                 200                 205

Ala Gly Tyr Thr Gly Pro His Cys Asp Gln Glu Leu Pro Val Cys Gln
    210                 215                 220

Glu Leu Arg Cys Pro Gln Asn Thr Gln Cys Ser Ala Glu Ala Pro Ser
225                 230                 235                 240

Cys Arg Cys Leu Pro Gly Tyr Thr Gln Gly Ser Glu Cys Arg Ala
                245                 250                 255

Pro Asn Pro Cys Trp Pro Ser Pro Cys Ser Leu Leu Ala Gln Cys Ser
            260                 265                 270

Val Ser Pro Lys Gly Gln Ala Gln Cys His Cys Pro Glu Asn Tyr His
        275                 280                 285

Gly Asp Gly Met Val Cys Leu Pro Lys Asp Pro Cys Thr Asp Asn Leu
    290                 295                 300

Gly Gly Cys Pro Ser Asn Ser Thr Leu Cys Val Tyr Gln Lys Pro Gly
305                 310                 315                 320

Gln Ala Phe Cys Thr Cys Arg Pro Gly Leu Val Ser Ile Asn Ser Asn
```

-continued

```
                325                 330                 335
Ala Ser Ala Gly Cys Phe Ala Phe Cys Ser Pro Phe Ser Cys Asp Arg
            340                 345                 350

Ser Ala Thr Cys Gln Val Thr Ala Asp Gly Lys Thr Ser Cys Val Cys
            355                 360                 365

Arg Glu Ser Glu Val Gly Asp Gly Arg Ala Cys Tyr Gly His Leu Leu
            370                 375                 380

His Glu Val Gln Lys Ala Thr Gln Thr Gly Arg Val Phe Leu Gln Leu
385                 390                 395                 400

Arg Val Ala Val Ala Met Met Asp Gln Gly Cys Arg Glu Ile Leu Thr
                405                 410                 415

Thr Ala Gly Pro Phe Thr Val Leu Val Pro Ser Val Ser Ser Phe Ser
                420                 425                 430

Ser Arg Thr Met Asn Ala Ser Leu Ala Gln Gln Leu Cys Arg Gln His
            435                 440                 445

Ile Ile Ala Gly Gln His Ile Leu Glu Asp Thr Arg Thr Gln Gln Thr
            450                 455                 460

Arg Arg Trp Trp Thr Leu Ala Gly Gln Glu Ile Thr Val Thr Phe Asn
465                 470                 475                 480

Gln Phe Thr Lys Tyr Ser Tyr Lys Tyr Lys Asp Gln Pro Gln Gln Thr
                485                 490                 495

Phe Asn Ile Tyr Lys Ala Asn Asn Ile Ala Ala Asn Gly Val Phe His
            500                 505                 510

Val Val Thr Gly Leu Arg Trp Gln Ala Pro Ser Gly Thr Pro Gly Asp
            515                 520                 525

Pro Lys Arg Thr Ile Gly Gln Ile Leu Ala Ser Thr Glu Ala Phe Ser
            530                 535                 540

Arg Phe Glu Thr Ile Leu Glu Asn Cys Gly Leu Pro Ser Ile Leu Asp
545                 550                 555                 560

Gly Pro Gly Pro Phe Thr Val Phe Ala Pro Ser Asn Glu Ala Val Asp
                565                 570                 575

Ser Leu Arg Asp Gly Arg Leu Ile Tyr Leu Phe Thr Ala Gly Leu Ser
            580                 585                 590

Lys Leu Gln Glu Leu Val Arg Tyr His Ile Tyr Asn His Gly Gln Leu
            595                 600                 605

Thr Val Glu Lys Leu Ile Ser Lys Gly Arg Ile Leu Thr Met Ala Asn
            610                 615                 620

Gln Val Leu Ala Val Asn Ile Ser Glu Glu Gly Arg Ile Leu Leu Gly
625                 630                 635                 640

Pro Glu Gly Val Pro Leu Gln Arg Val Asp Val Met Ala Ala Asn Gly
                645                 650                 655

Val Ile His Met Leu Asp Gly Ile Leu Pro Pro Thr Ile Leu Pro
            660                 665                 670

Ile Leu Pro Lys His Cys Ser Glu Gln His Lys Ile Val Ala Gly
            675                 680                 685

Ser Cys Val Asp Cys Gln Ala Leu Asn Thr Ser Thr Cys Pro Pro Asn
            690                 695                 700

Ser Val Lys Leu Asp Ile Phe Pro Lys Glu Cys Val Tyr Ile His Asp
705                 710                 715                 720

Pro Thr Gly Leu Asn Val Leu Lys Lys Gly Cys Ala Ser Tyr Cys Asn
                725                 730                 735

Gln Thr Ile Met Glu Gln Gly Cys Cys Lys Gly Phe Phe Gly Pro Asp
            740                 745                 750
```

Cys Thr Gln Cys Pro Gly Gly Phe Ser Asn Pro Cys Tyr Gly Lys Gly
                755                 760                 765

Asn Cys Ser Asp Gly Ile Gln Gly Asn Gly Ala Cys Leu Cys Phe Pro
        770                 775                 780

Asp Tyr Lys Gly Ile Ala Cys His Ile Cys Ser Asn Pro Asn Lys His
785                 790                 795                 800

Gly Glu Gln Cys Gln Glu Asp Cys Gly Cys Val His Gly Leu Cys Asp
                805                 810                 815

Asn Arg Pro Gly Ser Gly Gly Val Cys Gln Gln Gly Thr Cys Ala Pro
            820                 825                 830

Gly Phe Ser Gly Arg Phe Cys Asn Glu Ser Met Gly Asp Cys Gly Pro
                835                 840                 845

Thr Gly Leu Ala Gln His Cys His Leu His Ala Arg Cys Val Ser Gln
        850                 855                 860

Glu Gly Val Ala Arg Cys Arg Cys Leu Asp Gly Phe Glu Gly Asp Gly
865                 870                 875                 880

Phe Ser Cys Thr Pro Ser Asn Pro Cys Ser His Pro Asp Arg Gly Gly
                885                 890                 895

Cys Ser Glu Asn Ala Glu Cys Val Pro Gly Ser Leu Gly Thr His His
            900                 905                 910

Cys Thr Cys His Lys Gly Trp Ser Gly Asp Gly Arg Val Cys Val Ala
        915                 920                 925

Ile Asp Glu Cys Glu Leu Asp Met Arg Gly Gly Cys His Thr Asp Ala
        930                 935                 940

Leu Cys Ser Tyr Val Gly Pro Gly Gln Ser Arg Cys Thr Cys Lys Leu
945                 950                 955                 960

Gly Phe Ala Gly Asp Gly Tyr Gln Cys Ser Pro Ile Asp Pro Cys Arg
                965                 970                 975

Ala Gly Asn Gly Gly Cys His Gly Leu Ala Thr Cys Arg Ala Val Gly
            980                 985                 990

Gly Gly Gln Arg Val Cys Thr Cys Pro Pro Gly Phe Gly Gly Asp Gly
        995                 1000                1005

Phe Ser Cys Tyr Gly Asp Ile Phe Arg Glu Leu Glu Ala Asn Ala
    1010                1015                1020

His Phe Ser Ile Phe Tyr Gln Trp Leu Lys Ser Ala Gly Ile Thr
    1025                1030                1035

Leu Pro Ala Asp Arg Arg Val Thr Ala Leu Val Pro Ser
    1040                1045                1050

<210> SEQ ID NO 8
<211> LENGTH: 449
<212> TYPE: PRT
<213> ORGANISM: Homo sapiens

<400> SEQUENCE: 8

Gln Val Thr Leu Lys Glu Ser Gly Pro Thr Leu Val Lys Pro Thr Gln
1               5                   10                  15

Thr Leu Thr Leu Thr Cys Ser Phe Ser Gly Phe Ser Leu Ser Thr Ser
            20                  25                  30

Gly Met Gly Ile Gly Trp Ile Arg Gln Pro Pro Gly Lys Ala Leu Glu
        35                  40                  45

Trp Leu Ala His Ile Trp Trp Asp Asp Asp Lys Arg Tyr Asn Pro Ala
    50                  55                  60

Leu Lys Ser Arg Leu Thr Ile Ser Lys Asp Thr Ser Lys Asn Gln Val

Val Leu Thr Met Thr Asn Met Asp Pro Val Asp Thr Ala Thr Tyr Tyr
65                  70                  75                  80

Cys Ala Arg His Tyr Gly Tyr Asp Pro Tyr Tyr Ala Met Asp Tyr Trp
                85                  90                  95

Gly Gln Gly Thr Leu Val Thr Val Ser Ser Ala Ser Thr Lys Gly Pro
            100                 105                 110

Ser Val Phe Pro Leu Ala Pro Cys Ser Arg Ser Thr Ser Glu Ser Thr
        115                 120                 125

Ala Ala Leu Gly Cys Leu Val Lys Asp Tyr Phe Pro Glu Pro Val Thr
130                 135                 140

Val Ser Trp Asn Ser Gly Ala Leu Thr Ser Gly Val His Thr Phe Pro
145                 150                 155                 160

Ala Val Leu Gln Ser Ser Gly Leu Tyr Ser Leu Ser Ser Val Val Thr
                165                 170                 175

Val Pro Ser Ser Ser Leu Gly Thr Lys Thr Tyr Thr Cys Asn Val Asp
            180                 185                 190

His Lys Pro Ser Asn Thr Lys Val Asp Lys Arg Val Glu Ser Lys Tyr
        195                 200                 205

Gly Pro Pro Cys Pro Pro Cys Pro Ala Pro Glu Phe Glu Gly Gly Pro
210                 215                 220

Ser Val Phe Leu Phe Pro Pro Lys Pro Lys Asp Thr Leu Met Ile Ser
225                 230                 235                 240

Arg Thr Pro Glu Val Thr Cys Val Val Val Asp Val Ser Gln Glu Asp
                245                 250                 255

Pro Glu Val Gln Phe Asn Trp Tyr Val Asp Gly Val Glu Val His Asn
            260                 265                 270

Ala Lys Thr Lys Pro Arg Glu Glu Gln Phe Asn Ser Thr Tyr Arg Val
        275                 280                 285

Val Ser Val Leu Thr Val Leu His Gln Asp Trp Leu Asn Gly Lys Glu
290                 295                 300

Tyr Lys Cys Lys Val Ser Asn Lys Gly Leu Pro Ser Ser Ile Glu Lys
305                 310                 315                 320

Thr Ile Ser Lys Ala Lys Gly Gln Pro Arg Glu Pro Gln Val Tyr Thr
                325                 330                 335

Leu Pro Pro Ser Gln Glu Glu Met Thr Lys Asn Gln Val Ser Leu Thr
            340                 345                 350

Cys Leu Val Lys Gly Phe Tyr Pro Ser Asp Ile Ala Val Glu Trp Glu
        355                 360                 365

Ser Asn Gly Gln Pro Glu Asn Asn Tyr Lys Thr Thr Pro Pro Val Leu
370                 375                 380

Asp Ser Asp Gly Ser Phe Phe Leu Tyr Ser Arg Leu Thr Val Asp Lys
385                 390                 395                 400

Ser Arg Trp Gln Glu Gly Asn Val Phe Ser Cys Ser Val Met His Glu
                405                 410                 415

Ala Leu His Asn His Tyr Thr Gln Lys Ser Leu Ser Leu Ser Leu Gly
            420                 425                 430

Lys
        435                 440                 445

<210> SEQ ID NO 9
<211> LENGTH: 215
<212> TYPE: PRT
<213> ORGANISM: Homo sapiens -continued

<400> SEQUENCE: 9

Glu Ile Val Leu Thr Gln Ser Pro Gly Thr Leu Ser Leu Ser Pro Gly
1               5                   10                  15

Glu Arg Ala Thr Leu Ser Cys Thr Ala Ser Ser Val Ser Ser Ser
            20                  25                  30

Tyr Leu His Trp Tyr Gln Gln Lys Pro Gly Lys Ala Pro Lys Leu Leu
            35                  40                  45

Ile Tyr Arg Thr Ser Asn Leu Ala Ser Gly Val Pro Ser Arg Phe Ser
        50                  55                  60

Gly Ser Gly Ser Gly Thr Asp Tyr Thr Leu Thr Ile Ser Ser Leu Gln
65              70                  75                  80

Pro Glu Asp Phe Ala Thr Tyr Tyr Cys His Gln Tyr His Arg Ser Pro
                85                  90                  95

Pro Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Lys Ser Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 10
<211> LENGTH: 7
<212> TYPE: PRT
<213> ORGANISM: Homo sapiens

<400> SEQUENCE: 10

Thr Ser Gly Met Gly Ile Gly
1               5

<210> SEQ ID NO 11
<211> LENGTH: 16
<212> TYPE: PRT
<213> ORGANISM: Homo sapiens

<400> SEQUENCE: 11

His Ile Trp Trp Asp Asp Lys Arg Tyr Asn Pro Ala Leu Lys Ser
1               5                   10                  15

<210> SEQ ID NO 12
<211> LENGTH: 12
<212> TYPE: PRT
<213> ORGANISM: Homo sapiens

<400> SEQUENCE: 12

His Tyr Gly Tyr Asp Pro Tyr Tyr Ala Met Asp Tyr
1               5                   10

<210> SEQ ID NO 13

```
<211> LENGTH: 12
<212> TYPE: PRT
<213> ORGANISM: Homo sapiens

<400> SEQUENCE: 13

Thr Ala Ser Ser Ser Val Ser Ser Ser Tyr Leu His
1               5                   10

<210> SEQ ID NO 14
<211> LENGTH: 7
<212> TYPE: PRT
<213> ORGANISM: Homo sapiens

<400> SEQUENCE: 14

Arg Thr Ser Asn Leu Ala Ser
1               5

<210> SEQ ID NO 15
<211> LENGTH: 9
<212> TYPE: PRT
<213> ORGANISM: Homo sapiens

<400> SEQUENCE: 15

His Gln Tyr His Arg Ser Pro Pro Thr
1               5

<210> SEQ ID NO 16
<211> LENGTH: 12
<212> TYPE: PRT
<213> ORGANISM: Homo sapiens

<400> SEQUENCE: 16

Pro Ser Asn Pro Cys Ser His Pro Asp Arg Gly Gly
1               5                   10

<210> SEQ ID NO 17
<211> LENGTH: 15
<212> TYPE: PRT
<213> ORGANISM: Homo sapiens

<400> SEQUENCE: 17

Phe Arg Gly Ser Ala Cys Gln Glu Cys Gln Asp Pro Asn Arg Phe
1               5                   10                  15
```